(12) United States Patent
Matsuda et al.

(10) Patent No.: US 11,038,163 B2
(45) Date of Patent: Jun. 15, 2021

(54) NONAQUEOUS ELECTROLYTE SECONDARY BATTERY AND PRODUCTION METHOD THEREFOR

(71) Applicant: SANYO Electric Co., Ltd., Daito (JP)

(72) Inventors: Tetsuya Matsuda, Hyogo (JP); Haruya Nakai, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 56 days.

(21) Appl. No.: 16/254,819

(22) Filed: Jan. 23, 2019

(65) Prior Publication Data

US 2019/0273251 A1    Sep. 5, 2019

(30) Foreign Application Priority Data

Mar. 2, 2018   (JP) .............................. JP2018-037100

(51) Int. Cl.
| | |
|---|---|
| *H01M 10/0587* | (2010.01) |
| *H01M 4/62* | (2006.01) |
| *H01M 4/36* | (2006.01) |
| *H01M 4/04* | (2006.01) |
| *H01M 4/587* | (2010.01) |
| *H01M 10/04* | (2006.01) |

(52) U.S. Cl.
CPC ......... *H01M 4/366* (2013.01); *H01M 4/0402* (2013.01); *H01M 4/587* (2013.01); *H01M 4/622* (2013.01); *H01M 10/0459* (2013.01); *H01M 10/0587* (2013.01)

(58) Field of Classification Search
None
See application file for complete search history.

(56) References Cited

U.S. PATENT DOCUMENTS

| | | | |
|---|---|---|---|
| 6,420,070 B1 * | 7/2002 | Kasamatsu | ........... H01M 4/133 |
| | | | 423/445 R |
| 2009/0181300 A1 | 7/2009 | Kim | |
| 2017/0162850 A1 * | 6/2017 | Murakami | .............. B32B 27/32 |

FOREIGN PATENT DOCUMENTS

| | | |
|---|---|---|
| JP | 2005-327680 A | 11/2005 |
| JP | 5090380 B2 | 12/2012 |

* cited by examiner

*Primary Examiner* — Yoshitoshi Takeuchi
(74) *Attorney, Agent, or Firm* — Westerman, Hattori, Daniels & Adrian, LLP

(57) ABSTRACT

A nonaqueous electrolyte secondary battery includes a positive electrode plate having a positive electrode active material layer formed on a positive electrode core, a negative electrode plate having a negative electrode active material layer formed on a negative electrode core, and a flat-shape wound electrode body in which the positive electrode plate and the negative electrode plate are wound through a separator. Further, a protective layer is formed on the positive electrode active material layer or the negative electrode active material layer. The protective layer contains ceramic particles and a binder, and the average particle diameter (D50) and the average particle diameter (D90) of the ceramic particles are 1.0 µm to 1.8 µm and 3.0 µm to 5.0 µm, respectively.

3 Claims, 4 Drawing Sheets

NONAQUEOUS ELECTROLYTE SECONDARY BATTERY AND PRODUCTION METHOD THEREFOR

CROSS REFERENCE TO RELATED APPLICATIONS

The present invention application claims priority to Japanese Patent Application No. 2018-037100 filed in the Japan Patent Office on Mar. 2, 2018, the entire contents of which are incorporated herein by reference.

BACKGROUND OF THE INVENTION

Field of the Invention

The present invention relates to a nonaqueous electrolyte secondary battery and a production method therefor.

Description of Related Art

Nonaqueous electrolyte secondary batteries are used for a hybrid electric vehicle, an electric vehicle, a large-scale electricity storage system, etc.

For the purpose of preventing internal short circuits in these nonaqueous electrolyte secondary batteries, there has been proposed a technique of providing a protective layer containing ceramic particles of alumina or the like and a binder on the surface of a positive electrode active material layer or the surface of a negative electrode active material layer (Japanese Patent No. 5090380).

BRIEF SUMMARY OF THE INVENTION

An object of the present invention is to provide a nonaqueous electrolyte secondary battery suppressing an internal short circuit and having excellent output characteristics.

In an aspect of the present invention, a nonaqueous electrolyte secondary battery includes a positive electrode plate having a positive electrode active material layer formed on a positive electrode core, a negative electrode plate having a negative electrode active material layer formed on a negative electrode core, and a flat-shape wound electrode body in which the positive electrode plate and the negative electrode plate are wound through a separator. A protective layer is formed on the positive electrode active material layer or the negative electrode active material layer, and the protective layer contains ceramic particles and a binder. The average particle diameter (D50) of the ceramic particles at a volume cumulative frequency of 50% is 1.0 μm to 1.8 μm, and the average particle diameter (D90) of the ceramic particles at a volume cumulative frequency of 90% is 3.0 μm to 5.0 μm.

According to the configuration of a nonaqueous electrolyte secondary battery in an aspect of the present invention, it is possible to effectively suppress the formation of a locally thick portion as a projecting portion in a protective layer. Therefore, the nonaqueous electrolyte secondary battery suppresses internal short circuit. Also, according to the configuration of a nonaqueous electrolyte secondary battery in an aspect of the present invention, it is possible to effectively suppress the inhibition of lithium ion diffusion by a protective layer, and thus the nonaqueous electrolyte secondary battery has excellent output characteristics.

The configuration may be such that the protective layer is formed on the negative electrode active material layer, the negative electrode active material layer contains carbon particles as a negative electrode active material, and the average particle diameter (D50) of the carbon particles at a volume cumulative frequency of 50% is 8.0 μm to 15.0 μm.

The configuration may be such that the negative electrode active material layer contains styrene-butadiene rubber and at least one of carboxymethyl cellulose and a carboxymethyl cellulose salt, and the packing density of the negative electrode active material layer is 1.0 g/cm$^3$ to 1.6 g/cm$^3$.

The configuration may be such that the surface roughness Rz of the positive electrode active material layer or the negative electrode active material layer, on which the protective layer is formed, is 3.0 μm to 7.0 μm.

In an aspect of the present invention, a method for producing a nonaqueous electrolyte secondary battery produces a nonaqueous electrolyte secondary battery including a positive electrode plate having a positive electrode active material layer formed on a positive electrode core, a negative electrode plate having a negative electrode active material layer formed on a negative electrode core, a flat-shape wound electrode body in which the positive electrode plate and the negative electrode plate are wound through a separator, and a battery case which houses the flat-shape wound electrode body, wherein a protective layer is formed on the positive electrode active material layer or the negative electrode active material layer, and the protective layer contains ceramic particles and a binder. The method includes a step of preparing a protective layer slurry containing the ceramic particles, which have an average particle diameter (D50) of 1.0 μm to 1.8 μm at a volume cumulative frequency of 50% and an average particle diameter (D90) of 3.0 μm to 5.0 μm at a volume cumulative frequency of 90%, and the binder, a step of applying the protective layer slurry on the positive electrode active material layer or the negative electrode active material layer, a step of drying the protective layer slurry, a step of winding the positive electrode plate and the negative electrode plate through the separator and then molding the wound body into a flat shape to form a flat-shape wound electrode body, and a step of inserting the flat-shape wound electrode body into the battery case.

According to a method for producing a nonaqueous electrolyte secondary battery in an aspect of the present invention, it is possible to effectively suppress the formation of a locally thick portion as a projecting portion in a protective layer. Therefore, the nonaqueous electrolyte secondary battery suppresses internal short-circuit. Also, according to a method for producing a nonaqueous electrolyte secondary battery in an aspect of the present invention, it is possible to effectively suppress the inhibition of lithium ion diffusion by a protective layer, and thus the nonaqueous electrolyte secondary battery has excellent output characteristics.

The configuration may be such that the protective layer is formed on the negative electrode active material layer, the negative electrode active material layer contains carbon particles as a negative electrode active material, and the average particle diameter (D50) of the carbon particles at a volume cumulative frequency of 50% is 8.0 μm to 15.0 μm.

The configuration may be such that the negative electrode active material layer contains styrene-butadiene rubber and at least one of carboxymethyl cellulose and a carboxymethyl cellulose salt, and the packing density of the negative electrode active material layer is 1.0 g/cm$^3$ to 1.6 g/cm$^3$.

The configuration may be such that the surface roughness Rz of the positive electrode active material layer or the negative electrode active material layer, on which the protective layer is formed, is 3.0 μm to 7.0 μm.

The present invention can provide a nonaqueous electrolyte secondary battery which suppresses internal short circuit and has excellent output characteristics.

DETAILED DESCRIPTION OF THE INVENTION

Embodiments of the present invention are described below. The present invention is not limited to the embodiments described below. First, the configuration of a nonaqueous electrolyte secondary battery 100 according to an embodiment is described by using FIG. 1 and FIG. 2.

Figure 1:
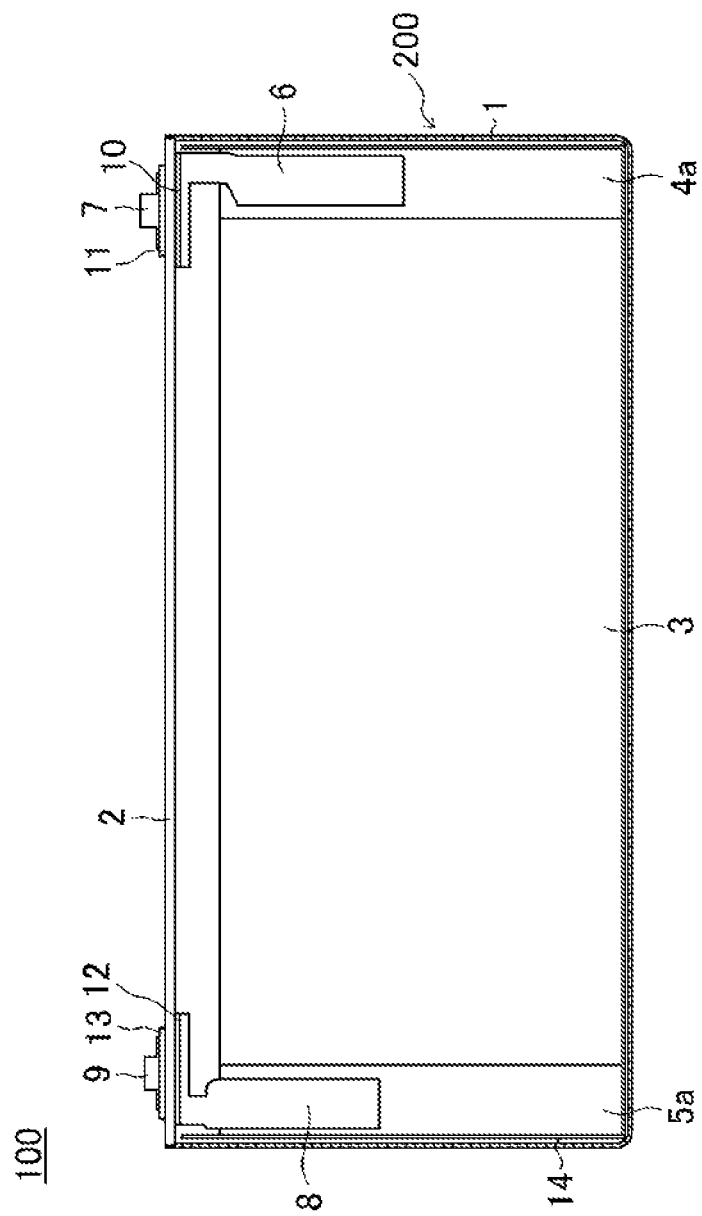
FIG. 1 is a front view showing the inside of a nonaqueous electrolyte secondary battery according to an embodiment of the present invention, excluding the front of a battery case and the front of an insulating sheet.
Figure 2:
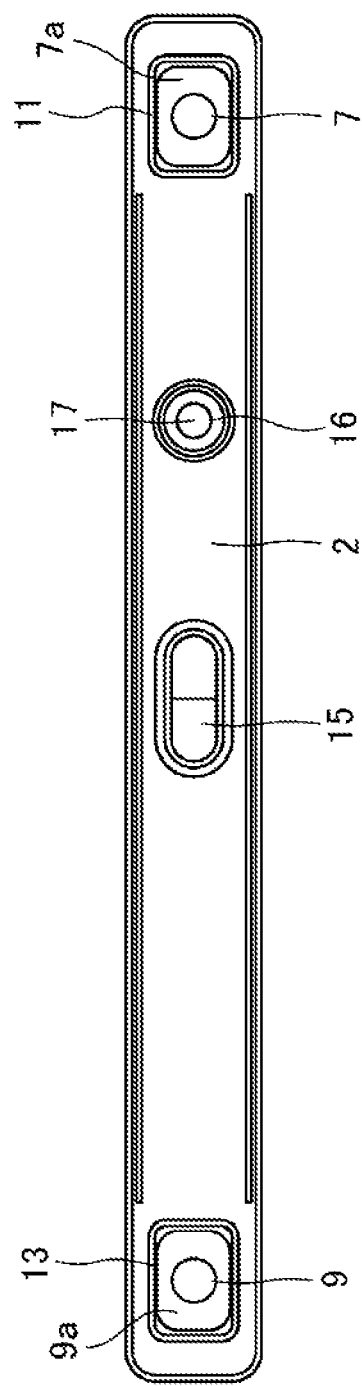
FIG. 2 is a top view showing a nonaqueous electrolyte secondary battery according to an embodiment of the present invention.

As shown in FIG. 1 and FIG. 2, the nonaqueous electrolyte secondary battery 100 includes a prismatic outer package 1 having an opening in an upper portion, and a sealing plate 2 which seals the opening. The prismatic outer package 1 and the sealing plate 2 constitute a battery case 200. Each of the prismatic outer package 1 and the sealing plate 2 is made of a metal and is preferably made of aluminum or an aluminum alloy. The prismatic outer package 1 houses, together with a nonaqueous electrolyte, a flat-shape wound electrode body 3 formed by winding a positive electrode plate 4 and a negative electrode plate 5 through a separator (not shown in the drawings). The positive electrode plate 4 has a positive electrode active material layer 4b which is formed on a metal-made positive electrode core 4a and contains a positive electrode active material, and a positive electrode core exposed portion is formed, in which the positive electrode core 4a is exposed along the longitudinal direction. The negative electrode plate 5 has a negative electrode active material layer 5b which is formed on a metal-made negative electrode core 5a and contains a negative electrode active material, and a negative electrode core exposed portion is formed, in which the negative electrode core 5a is exposed along the longitudinal direction. The positive electrode core 4a is preferably made of aluminum or an aluminum alloy, and the negative electrode core 5a is preferably made of copper or a copper alloy.

In the wound electrode body 3, the positive electrode core 4a without the positive electrode active material layer 4b is disposed in a layered state on one of the end sides in the direction in which the winding axis extends. The positive electrode core 4a is disposed in a layered state by winding. A positive electrode current collector 6 is connected to the layered positive electrode core 4a. The positive electrode current collector 6 is preferably made of aluminum or an aluminum alloy.

In the wound electrode body 3, the negative electrode core 5a without the negative electrode active material layer 5b is disposed in a layered state on the other end side in the direction in which the winding axis extends. The negative electrode core 5a is disposed in a layered state by winding. A negative electrode current collector 8 is connected to the layered negative electrode core 5a. The negative electrode current collector 8 is preferably made of copper or a copper alloy.

A positive electrode terminal 7 has a flange portion 7a disposed on the sealing plate 2 on the outside of the battery and an insertion portion inserted into a through hole provided in the sealing plate 2. A negative electrode terminal 9 has a flange portion 9a disposed on the sealing plate 2 on the outside of the battery and an insertion portion inserted into a through hole provided in the sealing plate 2. Each of the positive electrode terminal 7 and the negative electrode terminal 9 is made of a metal.

The positive electrode terminal 7 and the positive electrode current collector 6 are fixed to the sealing plate 2 through a resin-made inner insulating member 10 and a resin-made outer insulating member 11, respectively. The negative electrode terminal 9 and the negative electrode current collector 8 are fixed to the sealing plate 2 through a resin-made internal insulating member 12 and a resin-made outer insulating member 13, respectively. The inner insulating member 10 is disposed between the sealing plate 2 and the positive electrode current collector 6, and the outer insulating member 11 is disposed between the sealing plate 2 and the positive electrode terminal 7. The inner insulating member 12 is disposed between the sealing plate 2 and the negative electrode current collector 8, and the outer insulating member 13 is disposed between the sealing plate 2 and the negative electrode terminal 9. The wound electrode body 3 is housed in the state of being covered with an insulating sheet 14 in the prismatic outer package 1. The sealing plate 2 is welded to the periphery of the opening of the prismatic outer package 1 by laser welding or the like. The sealing plate 2 has an electrolyte injection hole 16 which is sealed by a sealing plug 17 after the nonaqueous electrolyte solution is injected into the battery case 200. In addition, a gas discharge valve 15 is formed in the sealing plate 2 in order to discharge gas to the outside of the battery case 200 when the pressure in the battery is a predetermined value or more.

Next, a method for producing the nonaqueous electrolyte secondary battery 100 is described.

<Formation of Positive Electrode Plate>

A positive electrode active material layer slurry was prepared by mixing $LiNi_{0.35}Co_{0.35}Mn_{0.3}O_2$ as a positive electrode active material, carbon black as a conductive agent, polyvinylidene fluoride (PVdF) as a binder, and N-methyl-2-pyrrolidone (NMP) as a dispersion medium. The mixing ratio of the positive electrode active material, the conductive agent, and the binder was 91:6:3 in terms of mass ratio. The prepared positive electrode active material layer slurry was applied on one of the surfaces of an aluminum ally foil (thickness: 15 μm) used as the positive electrode core and then dried to remove NMP used as the dispersion medium for preparing the positive electrode active material layer slurry, thereby forming a positive electrode active material layer. By using the same method, a positive electrode active material layer was formed on the other surface of the aluminum alloy foil. Then, the aluminum alloy foil was rolled by using a rolling roller until the positive electrode active material layers 4b had a predetermined packing density (2.61 g/cm$^3$) and then cut to predetermined dimensions, forming the positive electrode plate 4.

Figure 3A:
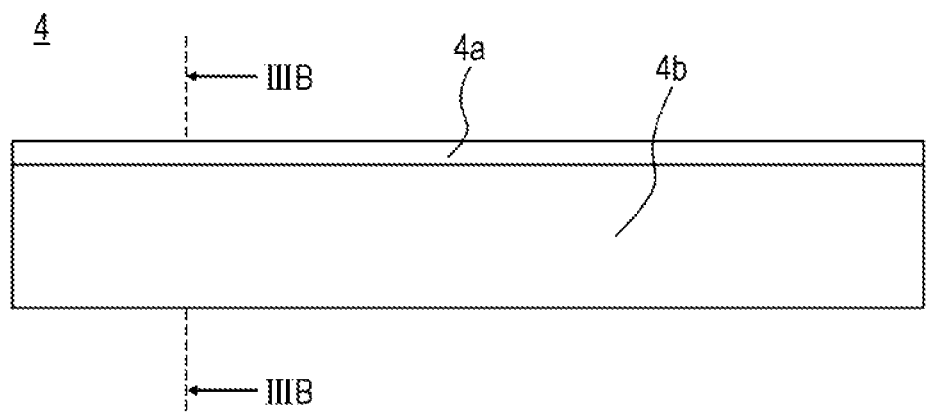
FIG. 3A is a plan view of a positive electrode plate according to an embodiment of the present invention.
Figure 3B:
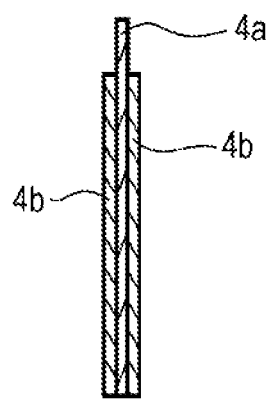
FIG. 3B is a sectional view of the positive electrode plate taken along line IIIB-IIIB in FIG. 3A.

As shown in FIGS. 3A and 3B, the positive electrode active material layers 4b are formed on both surfaces of the positive electrode core 4a. The positive electrode plate 4 has a strip shape. Also, a positive electrode core exposed portion, where the positive electrode active material layers 4b are not formed on both surfaces, is formed at an end in the width direction of the positive electrode plate 4.

<Formation of Negative Electroe Plate>

A negative electrode active material layer slurry was prepared by mixing graphite particles as a negative electrode active material, carboxymethyl cellulose (CMC) as a thickener, styrene butadiene rubber (SBR) as a binder, and water as a dispersion medium. The mixing ratio of the negative electrode active material, the thickener (CMC), and the binder (SBR) was 98.9:0.7:0.4 in terms of mass ratio. The graphite particles used had an average particle diameter (D50) of 11 μm at a volume accumulative frequency of 50%. Then, the prepared negative electrode active material layer slurry was applied on one of the surfaces of a copper foil (thickness: 10 μm) used as the negative electrode core 5a and then dried to remove water used as the dispersion medium for preparing the negative electrode active material layer slurry, thereby forming a negative electrode active material layer 5b. By using the same method, a negative electrode active material layer 5b was formed on the other surface of the copper foil. Then, the copper foil was rolled by using a rolling roller until the negative electrode active material layers 5b had a predetermined packing density (1.11 g/cm$^3$). The amount of the negative electrode active material layer 5b formed on one of the surfaces of the negative electrode core 5a was 70 mg/10 cm$^2$ (70 mg of the negative electrode active material layer 5b was formed in an area of 10 cm$^2$ on one of the surfaces of the negative electrode core 5a). In addition, the surface roughness Rz of the negative electrode active material layers 5b was 5 μm. The surface roughness Rz was measured by the following method.

[Measurement of Surface Roughness Rz of Negative Electrode Active Material Layer]

The surface of each of the negative electrode active material layers 5b was observed with a laser microscope (OLYMPUS Corporation, OLS4100), and the surface roughness Rz was determined under conditions according to JIS B0601:2001.

Next, alumina particles, a binder (copolymer having an acrylonitrile structure), and N-methyl-2-pyrrolidone (NMP) as a dispersion medium were mixed at a weight ratio of 30:0.9:69.1, and the resultant mixture was dispersed by using a bead mill to form a protective layer slurry. The average particle diameter (D50) at a volume accumulative frequency of 50% of the alumina particles was 1.4 μm, and the average particle diameter (D90) at a volume accumulative frequency of 90% of the alumina particles was 3.5 μm. The protective layer slurry formed as described above was applied on the negative electrode active material layer 5b on one of the surfaces, and then NMP used as the dispersion medium was removed by drying, forming an insulating protective layer 5c containing the alumina particles and the binder on the negative electrode active material layer 5b on one of the surfaces. By using the same method, a protective layer 5c was formed on the negative electrode active material layer 5b on the other surface. Then, the negative electrode core 5a was cut to predetermined dimensions, forming the negative electrode plate 5. The thickness of each of the protective layers 5c was 3 μm.

The particle size distribution of the carbon particles used as the negative electrode active material and the particle size distribution of the alumina particles were measured by using a laser diffraction particle size distribution analyzer (SALD-2300, Shimadzu Corporation).

Figure 4A:
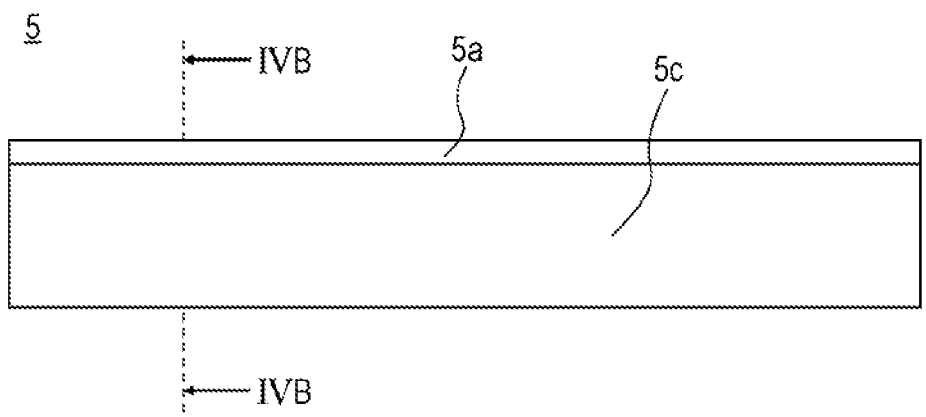
FIG. 4A is a plan view of a negative electrode plate according to an embodiment of the present invention.
Figure 4B:
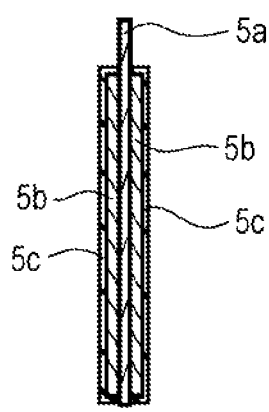
FIG. 4B is a sectional view of the negative electrode plate taken along line IVB-IVB in FIG. 4A.

As shown in FIGS. 4A and 4B, the negative electrode active material layers 5b are formed on both surfaces of the negative electrode core 5a. In addition, the protective layers 5c are formed on the surfaces of the negative electrode active material layers 5b. The negative electrode plate 5 has a strip shape. Also, a negative electrode core exposed portion, where the negative electrode active material layers 5b are not formed on both surfaces, is formed at an end in the width direction of the negative electrode plate 5.

The positive electrode plate 4 and negative electrode plate 5, which were formed by the method described above, were wound with a polyethylene porous separator disposed therebetween. Then, the resultant wound electrode body was pressed into a flat shape. As a result, the flat-shape wound electrode body 3 is formed, in which the positive electrode core 4a is layered at one of the ends, and the negative electrode core 5a is layered at the other end.

<Mounting of Components on Sealing Plate>

Next, a description is made of a method for mounting the positive electrode current collector 6, the positive electrode terminal 7, the negative electrode current collector 8, and the negative electrode terminal 9 on the sealing plate 2. The positive electrode side is described as an example. Mounting on the negative electrode side can be performed by the same method as on the positive electrode side.

The outer insulating member 11 is disposed on the sealing plate 2 on the outside of the battery, and the inner insulating member 10 and the positive electrode current collector 6 are disposed on the sealing plate 2 on the inside of the battery. The insertion portion of the positive electrode terminal 7 is inserted from the outside of the battery into the through holes provided in the outer insulating member 11, the sealing plate 2, the inner insulating member 10, and the positive electrode current collector 6, and the tip side of the insertion portion of the positive electrode terminal 7 is caulked on the positive electrode current collector 6. Therefore, the positive electrode terminal 7, the outer insulating member 11, the sealing plate 2, the inner insulating member 10, and the positive electrode current collector 6 are integrally fixed. The caulked portion at the tip of the insertion portion of the positive electrode terminal 7 is preferably welded to the positive electrode current collector 6.

<Mounting of Current Collector on Electrode Body>

The positive electrode current collector 6 is connected to the layered positive electrode core 4a by resistance-welding. Also, the negative electrode current collector 8 is connected to the layered negative electrode core 5a by resistance-welding.

<Preparation of Nonaqueous Electrolyte Solution>

A mixed solvent was prepared by mixing ethylene carbonate (EC), ethyl methyl carbonate (EMC), and diethyl carbonate (DEC) at a volume ratio (25° C., 1 atm) of 3:3:4. Then, LiPF$_6$ was added to the mixed solvent so that the concentration was 1 mol/L, and further 0.3% by mass of vinylene carbonate (VC) relative to the mass of the nonaqueous electrolyte was further added to the resultant mixture, thereby preparing a nonaqueous electrolyte solution.

The wound electrode body 3 is inserted in the state of being covered with the insulating sheet 14 into the prismatic outer package 1. Then, the sealing plate 2 is welded to the periphery of the opening of the prismatic outer package 1 by laser welding or the like. The nonaqueous electrolyte solution is injected into the battery case 200 from the electrolyte injection hole 16 of the sealing plate 2, and then the electrolyte injection hole 16 is sealed with the sealing plug 17. Consequently, a nonaqueous electrolyte secondary battery 100 of Example 1 is produced. The battery capacity of the nonaqueous electrolyte secondary battery 100 is 5 Ah.

Example 2

A nonaqueous electrolyte secondary battery was produced by the same method as for the nonaqueous electrolyte secondary battery 100 of Example 1 except that a protective layer slurry was prepared by using alumina particles having a D50 of 1.8 μm and a D90 of 4.7 μm, and regarded as a nonaqueous electrolyte secondary battery of Example 2.

Comparative Example 1

A nonaqueous electrolyte secondary battery was produced by the same method as for the nonaqueous electrolyte secondary battery 100 of Example 1 except that a protective layer slurry was prepared by using alumina particles having a D50 of 1.9 μm and a D90 of 6.0 μm, and regarded as a nonaqueous electrolyte secondary battery of Comparative Example 1.

Comparative Example 2

A nonaqueous electrolyte secondary battery was produced by the same method as for the nonaqueous electrolyte secondary battery 100 of Example 1 except that a protective layer slurry was prepared by using alumina particles having a D50 of 0.9 μm and a D90 of 2.0 μm, and regarded as a nonaqueous electrolyte secondary battery of Comparative Example 2.

[Measurement of Thickness of Flat-Shape Wound Electrode Body]

With respect to each of the nonaqueous electrolyte secondary batteries of Example 1, Example 2, Comparative Example 1, and Comparative Example 2, the thickness of a central portion of the flat-shape wound electrode body before inserted into the prismatic outer package 1 was measured. Table 1 shows the relative value of the thickness of the flat shape wound electrode body used in each of the nonaqueous electrolyte secondary batteries of Example 2, Comparative Example 1, and Comparative Example 2 on the assumption that the thickness of the wound electrode body 3 used in the nonaqueous electrolyte secondary battery 100 of Example 1 is 100%.

[Output Characteristics]

With respect to each of the nonaqueous electrolyte secondary batteries of Example 1, Example 2, Comparative Example 1, and Comparative Example 2, the output characteristics were measured by the following method. The nonaqueous electrolyte secondary battery was charged under a condition of 25° C. until the state of charge (SOC) was 50%. Next, discharging was performed for 10 seconds at a current value of each of 40 A, 80 A, 120 A, 160 A, 200 A, and 240 A, and the battery voltage was measured. The current value at 3 V was calculated from a current-voltage line, and the output (W) was determined by multiplying the current value (A) by 3 V. Table 1 shows the relative value of the output of each of the nonaqueous electrolyte secondary batteries of Example 2, Comparative Example 1, and Comparative Example 2 on the assumption that the output (W) of the nonaqueous electrolyte secondary battery 100 of Example 1 is 100%.

[Withstand Voltage Defect Rate]

With respect to each of the nonaqueous electrolyte secondary batteries of Example 1, Example 2, Comparative Example 1, and Comparative Example 2, the withstand voltage defect rate was measured by the following method. The conduction current of the pressed flat-shape wound electrode body was measured by applying a voltage, and the withstand voltage defect rate was determined by the following formula.

Withstand voltage defect rate (%)=(Number of wound electrode bodies causing insulation failure)/(Number of wound electrode bodies formed)×100

Table 1 shows D50 and D90 of the alumina particles of the protective layer slurries, the thicknesses of the flat-shape wound electrode bodies, the output characteristics, and the withstand voltage defect rates of Example 1, Example 2, Comparative Example 1, and Comparative Example 2.

TABLE 1

|  | D50 of alumina particles (μm) | D90 of alumina particles (μm) | Thickness of flat-shape wound electrode body (%) | Output characteristic (%) | Withstand voltage defect rate (%) |
| --- | --- | --- | --- | --- | --- |
| Example 1 | 1.4 | 3.5 | 100 | 100 | 0 |
| Example 2 | 1.8 | 4.7 | 101 | 100 | 0 |
| Comparative Example 1 | 1.9 | 6.0 | 103 | 100 | 2 |
| Comparative Example 2 | 0.9 | 2.0 | 99 | 95 | 0 |

When the D50 and D90 of the alumina particles are 1.9 μm and 6.0 μm, respectively, as in Comparative Example 1, a locally thick portion occurs in the protective layer 5c due to the excessively large particle diameter of the alumina particles. The locally thick portion in the protective layer 5c becomes a projecting portion which may break through the separator when the wound electrode body is pressed into a flat shape, thereby causing an ultra-short-circuit between the positive electrode plate 4 and the negative electrode plate 5. Therefore, a defective product is considered to occur in the withstand voltage test.

When the D50 and D90 of the alumina particles are 0.9 μm and 2.0 μm, respectively, as in Comparative Example 2, the alumina particles have an excessively small particle diameter. Therefore, the protective layer 5c is formed so that a recess portion in the surface of the negative electrode active material layer 5b is closely filled with the alumina particles. Thus, it is considered that the alumina particles easily inhibit lithium ion diffusion and thus decrease the output characteristics.

When the D50 and D90 of the alumina particles are 1.4 μm and 3.5 μm, respectively, as in Example 1 and when the D50 and D90 of the alumina particles are 1.8 μm and 4.7 μm, respectively, as in Example 2, it is possible to effectively suppress the formation of a locally thick projecting portion in the protective layer 5c. Also, it is possible to effectively suppress the phenomenon that the protective layer 5c is formed so that a recess portion in the surface of the negative electrode active material layer 5b is closely filled with the alumina particles. Therefore, the nonaqueous electrolyte secondary battery suppresses an internal short-circuit and has excellent output characteristics.

The present invention is particularly effective when the carbon particles are used as the negative electrode active material, D50 of the carbon particles is 8.0 μm to 15.0 μm, and the packing density of the negative electrode active material layer 5b is 1.0 g/cm³ to 1.60 g/cm³.

Also, the present invention particularly effective when the protective layer 5c is formed on the negative electrode active material layer 5b, and the surface roughness Rz of the negative electrode active material layer 5b is 3.0 μm to 7.0 μm.

<<Others>>

At least one selected from the group consisting of alumina particles, titania particles, and zirconia particles is preferably used as the ceramic particles contained in the protective layer.

A binder which is generally used for nonaqueous electrolyte secondary batteries can be used as the binder contained in the protective layer. Examples thereof include a copolymer containing an acrylonitrile structure, a polyimide resin, styrene-butadiene rubber (SBR), an ethylene-tetrafluoroethylene copolymer (ETFE), polyvinylidene fluoride (PVdF), a polytetrafluoroethylene resin (PTFE), carboxymethyl cellulose (CMC), and the like.

The content of the ceramic particles relative to the total mass of the protective layer is preferably 85.0% by mass to 99.0% by mass and more preferably 90.0% by mass to 98.5% by mass.

A carbon material which can absorb and release lithium ions is preferably used as the negative electrode active material. In addition, graphite, amorphous carbon, or carbon particles such as coated graphite with a surface coated with amorphous carbon, or the like is preferably used as the carbon material.

A lithium transition metal composite oxide is preferably used as the positive electrode active material. The lithium transition metal composite oxide preferably contains at least one of nickel, cobalt, and manganese.

A separator made of polyolefin, such as polyethylene, polypropylene, or the like, is preferably used as the separator. The separator may have a single-layer structure or a multilayer structure.

The nonaqueous electrolyte preferably contains an electrolyte salt dissolved in a nonaqueous solvent. Known materials can be used as the nonaqueous solvent and the electrolyte salt.

Usable examples of the nonaqueous solvent include esters, ethers, nitriles such as acetonitrile and the like, amides such as dimethylformamide and the like, a mixed solvent of two or more of these solvents, and the like. The nonaqueous solvent may contain a halogen-substituted compound produced by at least partially substituting the hydrogen of any one of these solvents with a halogen atom such as fluorine or the like.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, a lithium lower aliphatic carboxylate, $Li_2B_4O_7$, boric acid salts such as $Li(B(C_2O_4)F_2)$ and the like, $LiN(SO_2CF_3)_2$, imide salts such as $LiN(C_lF_{2l+1}SO_2)(C_mF_{2m+1}SO_2)$. {l and m are each an integer of 0 or more} and the like, and the like. These lithium salts may be used alone or as a mixture of a plurality of types. The concentration of the lithium salt is preferably, for example, 0.8 to 1.8 moles per L of the nonaqueous solvent.

In the examples, a description is made of an example in which the protective layer 5c is formed on the surface of the negative electrode active material layer 5b, but the protective layer may be provided on the surface of the positive electrode active material layer 4b.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A nonaqueous electrolyte secondary battery comprising:
    a positive electrode plate having a positive electrode active material layer formed on a positive electrode core;
    a negative electrode plate having a negative electrode active material layer formed on a negative electrode core; and
    a flat-shape wound electrode body in which the positive electrode plate and the negative electrode plate are wound with a separator interposed therebetween,
    wherein a protective layer is formed integrally on the positive electrode active material layer or the negative electrode active material layer so as to be supported thereby;
    the protective layer contains ceramic particles and a binder;
    the average particle diameter (D50) of the ceramic particles at a volume cumulative frequency of 50% is 1.0 μm to 1.8 μm;
    the average particle diameter (D90) of the ceramic particles at a volume cumulative frequency of 90% is 3.0 μm to 5.0 μm, and
    wherein the surface roughness Rz of the positive electrode active material layer or the negative electrode active material layer, on which the protective layer is supported, is 3.0 μm to 7.0 μm.

2. The nonaqueous electrolyte secondary battery according to claim 1,
    wherein the protective layer is formed on the negative electrode active material layer;
    the negative electrode active material layer contains carbon particles as a negative electrode active material; and
    the average particle diameter (D50) of the carbon particles at a volume cumulative frequency of 50% is 8.0 μm to 15.0 μm.

3. The nonaqueous electrolyte secondary battery according to claim 2,
    wherein the negative electrode active material layer contains styrene-butadiene rubber and at least one of carboxymethyl cellulose and a carboxymethyl cellulose salt; and
    the packing density of the negative electrode active material layer is 1.0 g/cm³ to 1.6 g/cm³.

* * * * *